United States Patent
Mendolia et al.

(10) Patent No.: US 6,470,176 B1
(45) Date of Patent: Oct. 22, 2002

(54) BATTERY PACKS THAT FACILITATE ACOUSTIC COMMUNICATIONS AND RADIOTELEPHONES INCORPORATING SAME

(75) Inventors: Gregory S. Mendolia, Forest, VA (US); James F. Brown, Jr.; Magnus F. Hansson, both of Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/434,045

(22) Filed: Nov. 4, 1999

(51) Int. Cl.[7] ............................................. H04Q 7/32
(52) U.S. Cl. ..................... 455/90; 455/575; 381/355; 381/357
(58) Field of Search ................. 455/575, 127, 455/90; 320/114, 115; 381/26, 126, 151, 355, 356, 357, 358, 360, 71.2

(56) References Cited

U.S. PATENT DOCUMENTS

| | | | |
|---|---|---|---|
| 5,251,329 A | * | 10/1993 | Takagi et al. .................... 45/89 |
| 5,282,245 A | * | 1/1994 | Anderson .................... 379/433 |
| 5,335,368 A | * | 8/1994 | Tamura ........................ 455/90 |
| 5,548,824 A | * | 8/1996 | Inbushi et al. ................ 455/90 |
| 5,682,418 A | * | 10/1997 | Ide .............................. 359/58 |
| 5,715,311 A | * | 2/1998 | Sudo et al. .................. 379/428 |
| 5,884,197 A | | 3/1999 | Ricardo et al. |
| 5,890,072 A | * | 3/1999 | Rabe ........................... 455/550 |

FOREIGN PATENT DOCUMENTS

| | | | |
|---|---|---|---|
| EP | 0 625 864 A1 | 11/1994 | |
| EP | 0 986 234 A2 | 6/1999 | |
| JP | 360160733 A | * 8/1985 | ............ H04B/1/38 |
| JP | 08204799 | 9/1996 | |
| WO | WO 97/42746 | 11/1997 | |
| WO | WO 99/123/22 | 3/1999 | |

* cited by examiner

Primary Examiner—Daniel Hunter
Assistant Examiner—Andrew T Harry
(74) Attorney, Agent, or Firm—Myers Bigel Sibley & Sajovec

(57) ABSTRACT

Handheld radiotelephones are provided with battery packs that facilitate the transmission of a person's voice to internally mounted microphones. A radiotelephone housing end portion is provided with an aperture that is in acoustic communication with an internally mounted microphone. A passageway extends through a battery pack from a sound inlet in a front portion thereof to a sound outlet in an end portion thereof. The sound outlet is in acoustic communication with the aperture when the battery pack is removably secured to the housing end. Accordingly, the sound inlet is in acoustic communication with the microphone via the passageway.

21 Claims, 7 Drawing Sheets

– continued –

BATTERY PACKS THAT FACILITATE ACOUSTIC COMMUNICATIONS AND RADIOTELEPHONES INCORPORATING SAME

FIELD OF THE INVENTION

The present invention relates generally to communications devices and, more particularly, to portable, handheld wireless communications devices.

BACKGROUND OF THE INVENTION

Handheld wireless communications devices, such as radiotelephones, have become increasingly popular for both personal and commercial use. However, with their increase in popularity, radiotelephones have also undergone miniaturization to facilitate storage and portability. Indeed, some contemporary radiotelephone models are only 9–12 centimeters in length.

A potential impediment to radiotelephone miniaturization can be conventional battery packs that provide power to radiotelephones. Typically mounted to the back of a radiotelephone, a conventional battery pack can increase the thickness of a radiotelephone. In addition to increasing thickness, battery packs attached to radiotelephones in conventional ways may also result in devices having non-ergonomic shapes which may be awkward to use.

FIGS. 1A–1D illustrate various conventional handheld radiotelephone styles with battery packs attached thereto. In FIG. 1A, a conventional radiotelephone 10 is illustrated having a battery pack 12 secured to a rear portion of the radiotelephone housing 14. FIG. 1B illustrates a "flip phone" style radiotelephone 10' having a battery pack 12' secured to a rear portion of the radiotelephone housing 14'. FIGS. 1C and 1D illustrate a "clam shell" style radiotelephone 10" having a housing 14" that is configured to pivot between open (FIG. 1C) and closed (FIG. 1D) positions. A battery pack 12" is secured to a portion of the housing 14", as illustrated. As illustrated in FIGS. 1A–1D, the thickness of each radiotelephone is increased by the respective battery pack secured thereto. Radiotelephone thickness may be further increased when optional high capacity batteries are used.

In addition, as handheld radiotelephones undergo miniaturization, the distance between a radiotelephone speaker and microphone can decrease. For various ergonomic reasons, there may be a limit below which it is undesirable to decrease the distance between the speaker and microphone of a handheld radiotelephone. A user may find it difficult or awkward to speak into a microphone of a handheld device that is not located adjacent to his or her mouth. Also, acoustic performance may decrease as the distance between mouth and microphone is increased. As a result, further miniaturization of handheld radiotelephones may be constrained because of a desire not to further decrease the distance between the speaker and microphone.

SUMMARY OF THE INVENTION

In view of the above, it is, therefore, an object of the present invention to accommodate miniaturization of handheld communication devices, such as radiotelephones.

It is another object of the present invention to ergonomically enhance handheld communications devices undergoing miniaturization, such as radiotelephones.

These and other objects of the present invention are provided, according to a first embodiment of the present invention, by a handheld radiotelephone having a battery pack removably secured to an end portion thereof and wherein a passageway in the battery pack is in acoustic communication with a microphone disposed within the radiotelephone. The battery pack has a contour that preferably conforms to the contour of the radiotelephone.

The microphone within the housing is in electrical communication with a transceiver and is also in acoustic communication with an aperture provided in the end portion to which the battery pack is removably secured. A passageway extends through the battery pack from a sound inlet in a front portion of the battery pack to a sound outlet in an end portion of the battery pack. The sound outlet is in acoustic communication with the aperture when the battery pack is removably secured to the radiotelephone end portion. Accordingly, the sound inlet is in acoustic communication with the microphone via the passageway.

According to a second embodiment of the present invention, a battery pack may be configured to be removably secured to a handheld radiotelephone at an angle relative to the radiotelephone. By securing the battery pack at an angle, a radiotelephone can be given a generally concave shape that generally follows the shape of a user's head from the user's ear to the user's mouth.

According to a third embodiment of the present invention, a "flip" battery pack, having an acoustic passageway as described above, may be hinged is to a radiotelephone end portion so as to be movable between a closed position and an open position. Alternatively, the "flip" battery pack may contain a microphone therewithin in lieu of the acoustic passageway.

Handheld radiotelephones having battery packs secured to an end portion thereof according to the various embodiments of the present invention can have a slimmer profile than conventional handheld radiotelephones. Slimmer profiles may facilitate storage and portability. Furthermore, because a battery pack according to the present invention provides a sound inlet close to a user's mouth, the effective distance between the microphone and speaker of a radiotelephone may be increased, even though overall radiotelephone size is decreased. As a result, radiotelephone ergonomics may be enhanced.

According to additional embodiments of the present invention, multiple acoustic passageways may be provided through a radiotelephone housing and a battery pack removably secured to the radiotelephone housing. These multiple acoustic passageways may facilitate the reduction of unwanted ambient noise in a transmitted voice signal.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

Figure 1A:
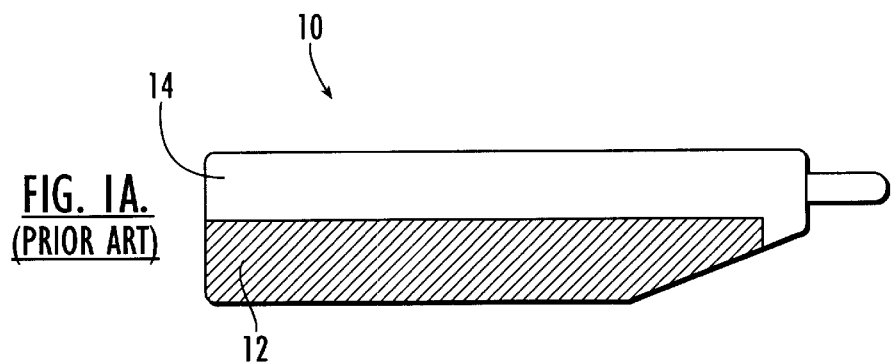
FIG. 1A is a side view of a conventional radiotelephone having a battery pack secured to a rear portion of the radiotelephone housing.
Figure 1B:
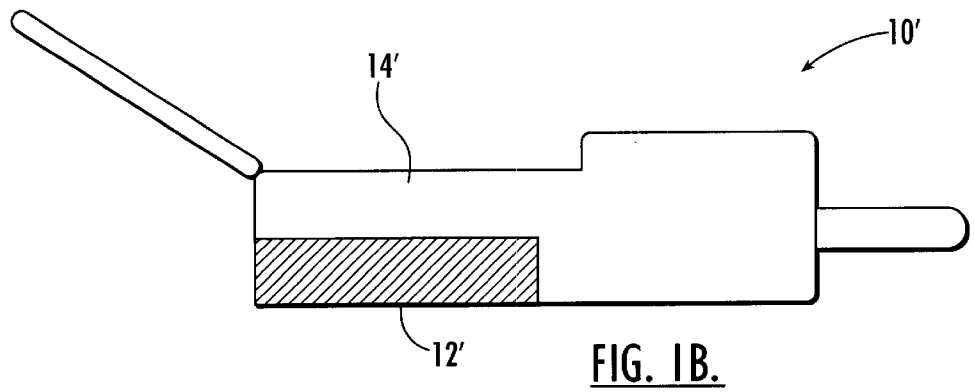
FIG. 1B is a side view of a conventional "flip phone" style radiotelephone having a battery pack secured to a rear portion of the radiotelephone housing.
Figure 1C:
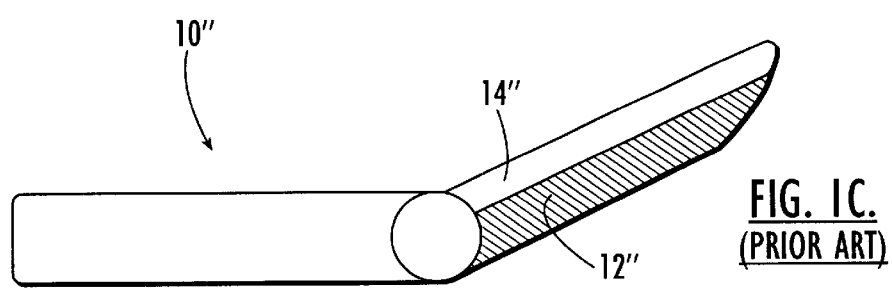
FIGS. 1C–1D are side views of a conventional "clam shell" style radiotelephone in respective open and closed positions and wherein a battery pack is secured to a portion thereof.
Figure 1D:
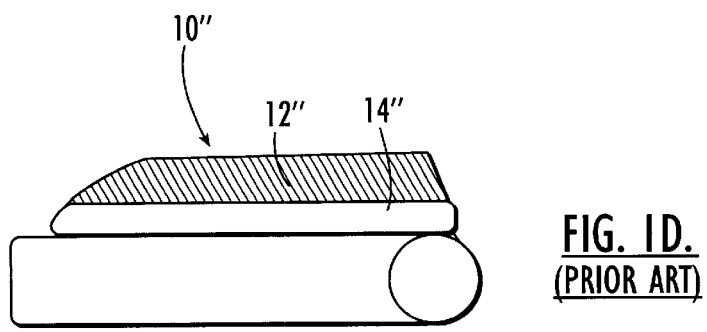
Figure 2:
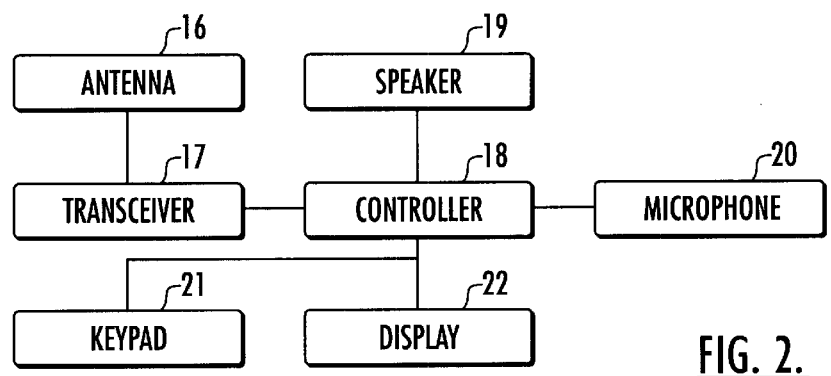
FIG. 2 is a schematic illustration of a conventional arrangement of electronic components for enabling a radiotelephone to transmit and receive telecommunications signals.

A conventional arrangement of electronic components that enable a radiotelephone to transmit and receive radiotelephone communications signals is shown schematically in FIG. 2, and is understood by those skilled in the art of radiotelephone communications. An antenna 16 for receiving and transmitting radiotelephone communications signals is electrically connected to a radio-frequency transceiver 17 that is further electrically connected to a controller 18, such as a microprocessor. The controller 18 is electrically connected to a speaker 19 that transmits a remote signal from the controller 18 to a user of a radiotelephone. The controller 18 is also electrically connected to a microphone 20 that receives a voice signal from a user and transmits the voice signal through the controller 18 and transceiver 17 to a remote device. The controller 18 is electrically connected to a keypad 21 and display 22 that facilitate radiotelephone operation.

Figure 3A:
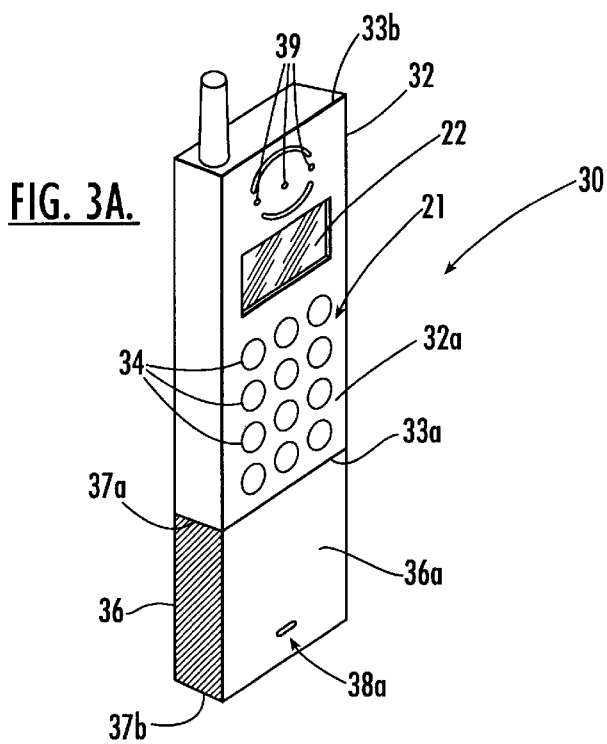
FIG. 3A is a perspective view of a radiotelephone having a battery pack with an internal acoustic passageway removably secured to an end thereof according to an embodiment of the present invention.
Figure 3B:
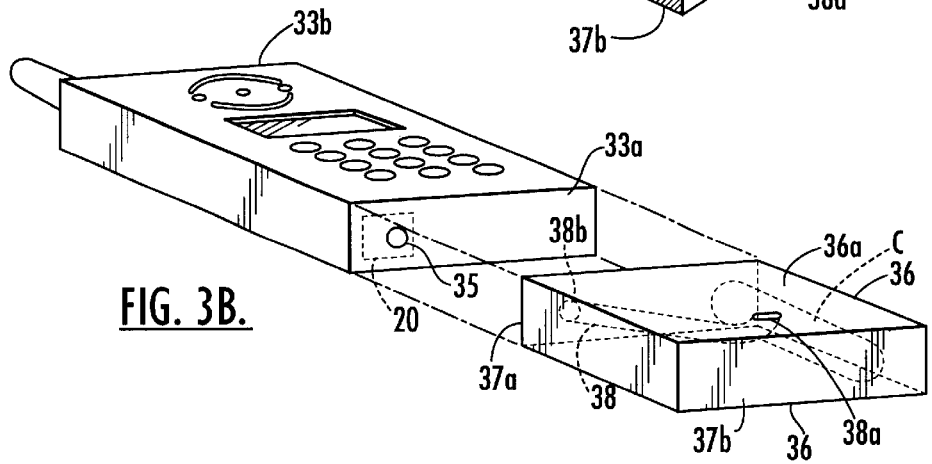
FIG. 3B is an exploded perspective view of the radiotelephone and battery pack of FIG. 3A illustrating the acoustic passageway extending through the battery pack and the aperture within the radiotelephone housing with which the acoustic passageway is in acoustic communication when the battery pack is removably secured to the radiotelephone housing.
Figure 3C:
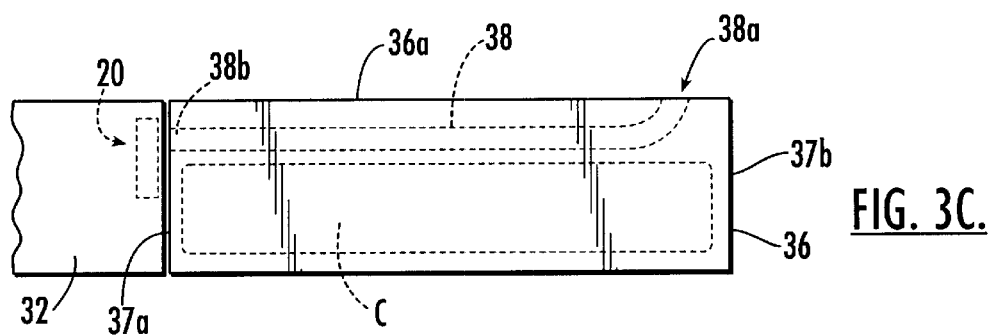
FIG. 3C is an enlarged, partial side elevation view of the radiotelephone of FIG. 3A.

Referring now to FIGS. 3A–3C, a radiotelephone 30 having a battery pack 36 removably secured to an end thereof, according to a first embodiment of the present invention, is illustrated. The radiotelephone 30 includes a housing 32 having a front portion 32a and opposite proximal and distal ends 33a, 33b. The housing 32 encloses electronic components (not shown), such as a transceiver, that enable the radiotelephone 30 to transmit and receive radiotelephone communications signals. The housing 32 also houses a keypad 21 including a plurality of keys 34 and a display 22 on the front portion 32a, as illustrated.

As illustrated in the exploded perspective view of FIG. 3B, a first aperture 35 is provided in the housing proximal end 33a. A microphone 20 is disposed within the housing 32 and is in electrical communication with the transceiver, as would be understood by one of skill in the art. The microphone 20 is also in acoustic communication with the first aperture 35 (i.e., the microphone 20 is capable of receiving sound, such as a person's voice, through the first aperture 35).

Referring back to FIG. 3A, the battery pack 36 is removably secured to the housing proximal end 33a and preferably has a contour that generally conforms to the contour of the radiotelephone housing 32. As is known by those of skill in the art, the battery pack 36 encloses at least one battery cell C (see FIG. 4) that supplies power to the radiotelephone 30. The illustrated battery pack 36 includes a front portion 36a and opposite proximal and distal ends 37a, 37b. The battery pack proximal end 37a is configured to be removably secured to the housing proximal end 33a, as would be understood by one of skill in the art. Also, as would be understood by one of skill in the art, a speaker (not shown) is disposed within the housing 32. In the illustrated embodiment, one or more slots 39, which serve as an earpiece, are adjacent the housing distal end 33b and are in acoustic communication with the internal speaker.

Referring now to FIG. 3C, a passageway 38 extends through the battery pack 36 from a sound inlet 38a in the front portion 36a of the battery pack 36 to a sound outlet 38b in the battery pack proximal end 37a. The sound outlet 38b is in acoustic communication with the first aperture 35 when the battery pack 36 is removably secured to the housing proximal end 33a. As a result, the sound inlet 38a is in acoustic communication with the microphone 20 via the passageway 38.

Figure 4:
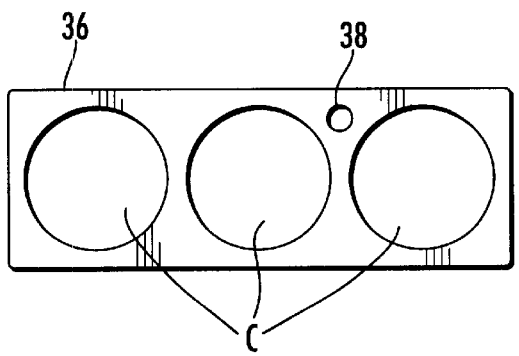
FIG. 4 is a cross-sectional end view of a battery pack, such as that illustrated in FIGS. 3A and 3B, illustrating an acoustic passageway disposed between adjacent battery cells.

In the illustrated embodiment, the sound inlet 38a is located adjacent the battery pack distal end 37b. However, the location of the sound inlet 38a is not limited to the illustrated embodiment. Furthermore, the configuration and location of the passageway 38 is not limited to the illustrated embodiment. In addition, the passageway 38 can be molded as part of the battery pack 36 or can be a separate acoustic tube incorporated therewithin. As illustrated in FIG. 4, the passageway 38 may extend through the battery pack 36 between adjacent battery cells C.

Figure 5:
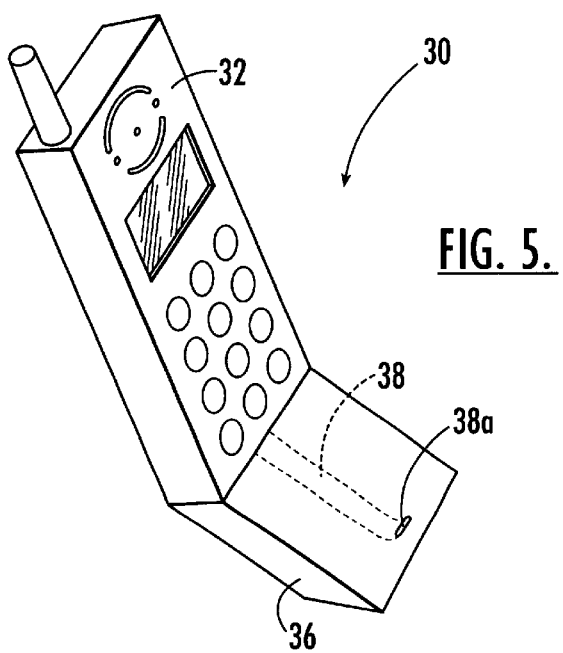
FIG. 5 is a perspective view of a radiotelephone having a battery pack removably secured to an end portion thereof at an angle, according to an embodiment of the present invention.

According to another embodiment of the present invention illustrated in FIG. 5, the battery pack 36 of FIGS. 3A–3C may be configured to be removably secured to a radiotelephone housing 32 at an angle relative to the housing 32. By securing the battery pack 36 at an angle, the radiotelephone 30 is given a generally concave shape that follows the shape of a user's head from the user's ear to the user's mouth.

Figure 6:
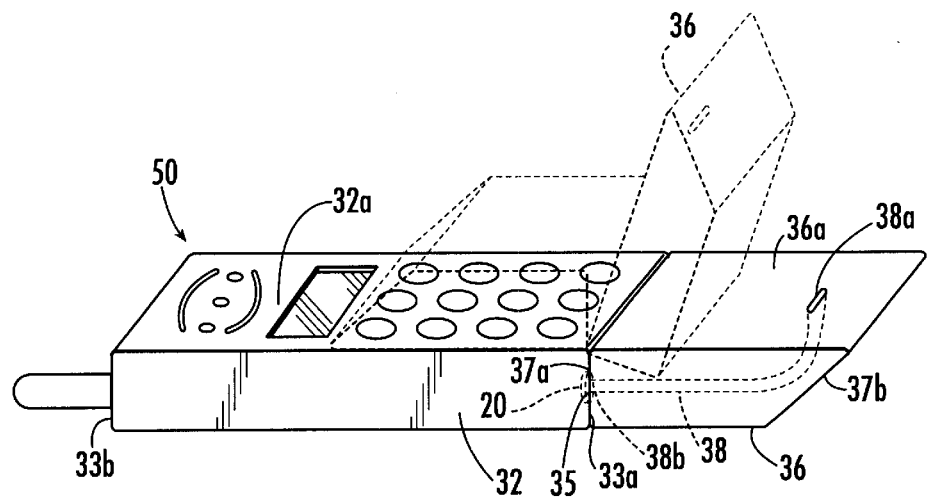
FIG. 6 is a perspective view of a radiotelephone having a "flip" battery pack hinged to an end thereof and movable between closed and open positions and wherein the battery pack includes a passageway in acoustic communication with a microphone disposed within the radiotelephone housing.

Referring now to FIG. 6, a radiotelephone 50 according to another embodiment of the present invention is illustrated. The illustrated radiotelephone 50 includes a housing 32 having a front portion 32a and opposite proximal and distal ends 33a, 33b. As described above, the housing 32 encloses a transceiver that enables the radiotelephone 50 to transmit and receive radiotelephone communications signals. The housing 32 also houses a keypad 21 including a plurality of keys 34 and a display 22 on the front portion 32a, as illustrated. A "flip" battery pack 36, that supplies power to the radiotelephone 50, is hinged to the housing proximal end 33a and is movable between a closed position wherein the "flip" battery pack 36 covers all or a portion of the keypad 21, and an open position wherein the keypad 21 is uncovered.

The illustrated "flip" battery pack 36 includes a front portion 36a, opposite proximal and distal ends 37a, 37b, and preferably has a contour that generally conforms to the contour of the radiotelephone housing 32. A passageway 38 extends through the "flip" battery pack 36 from a sound inlet 38a in the front portion of the "flip" battery pack 36 to a sound outlet 38b in the "flip" battery pack proximal end 37a. The sound outlet 38b is in acoustic communication with an aperture 35 in the housing proximal end 33a when the "flip" battery pack 36 is in the open position. As described above, the aperture 35 is in acoustic communication with a microphone 20 disposed within the radiotelephone housing 32. As a result, the sound inlet 38a in the "flip" battery pack 36 is in acoustic communication with the microphone 20 via the passageway 38 when the "flip" battery pack 36 is in the open position.

Battery power can be delivered from the "flip" battery pack 36 to the electronic circuitry within a radiotelephone in various conventional ways. For example, it is known to route electrical wires that provide power to a laptop computer display screen through a hinge that connects the screen to the laptop computer.

In the illustrated embodiment of FIG. 6, the sound inlet 38a is located adjacent the "flip" battery pack distal end 37b. However, the location of the sound inlet 38a is not limited to the illustrated embodiment. Furthermore, the configuration and location of the passageway 38 is not limited to the illustrated embodiment. For example, the passageway 38 could be routed through a hinge that connects the "flip" battery pack 36 to the radiotelephone 50. In addition, the passageway 38 can be molded as part of the "flip" battery pack 36 or can be a separate acoustic tube incorporated therein.

Figure 7:
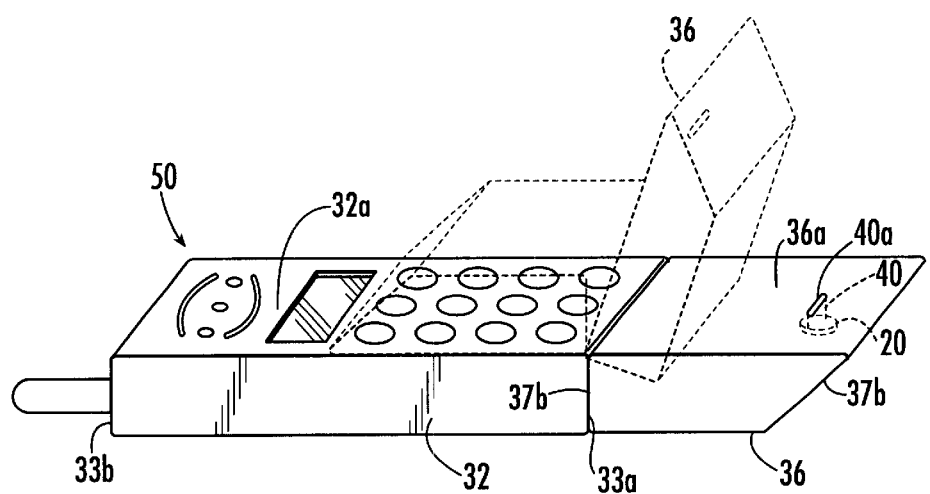
FIG. 7 is a perspective view of a radiotelephone having a "flip" battery pack hinged to a radiotelephone housing and movable between closed and open positions and wherein the battery pack includes a microphone disposed therewithin.
Figure 8:
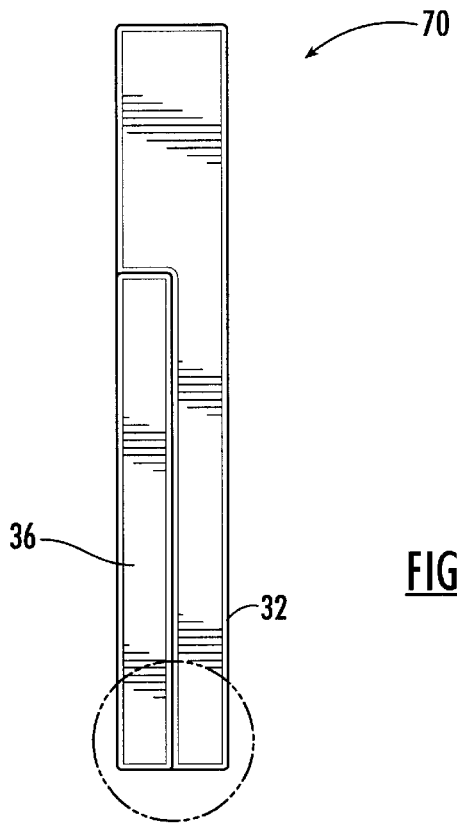
FIG. 8 is a schematic side view of a radiotelephone having a battery pack secured to a rear portion thereof and wherein a portion of the radiotelephone housing and battery pack is indicated through which multiple passageways, in acoustic communication with a microphone within the radiotelephone housing, extend.

Referring now to FIG. 7, a radiotelephone 60 according to another embodiment of the present invention is illustrated. A "flip" battery pack 36, that supplies power to the radiotelephone 50, is hinged to the housing proximal end 33a and is movable between a closed position wherein the "flip" battery pack 36 covers all or a portion of the keypad 21, and an open position wherein the keypad 21 is uncovered. The illustrated "flip" battery pack 36 includes a front portion 36a, opposite proximal and distal ends 37a, 37b, and preferably has a contour that generally conforms to the contour of the radiotelephone housing 32. A passageway 40 extends into the "flip" battery pack 36 from a sound inlet 40a in the "flip" battery pack front portion 36a. The passageway 40 is in acoustic communication with a microphone 20 disposed within the "flip" battery pack 36, as illustrated.

Referring now to FIGS. 8 and 9A–9F, a radiotelephone 70 incorporating additional embodiments of the present invention are illustrated. In each of the embodiments of FIGS. 8 and 9A–9F, a battery pack 36 is removably secured to a rear portion 32b of a radiotelephone housing 32. In each of the embodiments of FIGS. 9A–9F, multiple passageways are in acoustic communication with a microphone 20 disposed within the radiotelephone housing 32. The passageways are configured to direct sound from a user's mouth to the microphone 20 and to direct sound from ambient to cancel noise as described below.

Figure 9A:
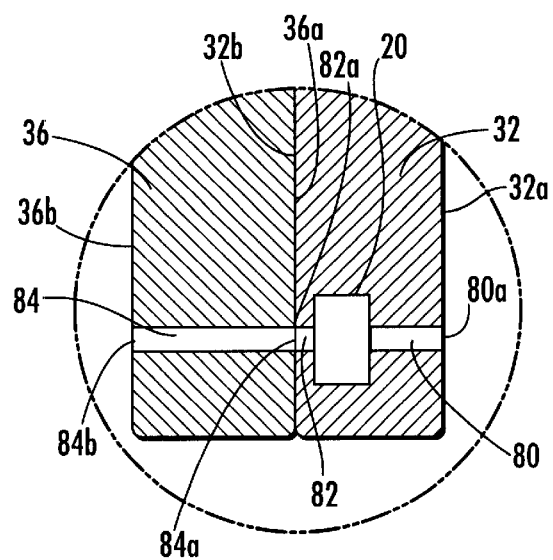
FIGS. 9A–9F illustrate various configurations of multiple passageways in the area indicated in FIG. 8.

Referring now to FIG. 9A, a first passageway 80 extends into the housing 32 from a first aperture 80a in the housing front portion 32a and is configured to direct sound from a user's mouth to the microphone 20. A second passageway 82 extends into the housing 32 from a second aperture 82a in the housing rear portion 32b. Accordingly, the first and second passageways 80, 82 are in acoustic communication with the microphone 20, as illustrated.

A third passageway 84 extends through the battery pack 36, as illustrated, and terminates at respective third and fourth apertures 84a, 84b in the battery pack front and rear portions 36a, 36b, respectively. Accordingly, the third aperture 84a in the battery pack front portion 36a is in acoustic communication with the second aperture 82a in the housing rear portion 32b when the battery pack 36 is removably secured to the housing rear portion 32b. As a result, the third passageway 84 is in acoustic communication with the microphone 20 via the second passageway 82 and is configured to direct sound from ambient to the microphone 20.

Figure 9B:
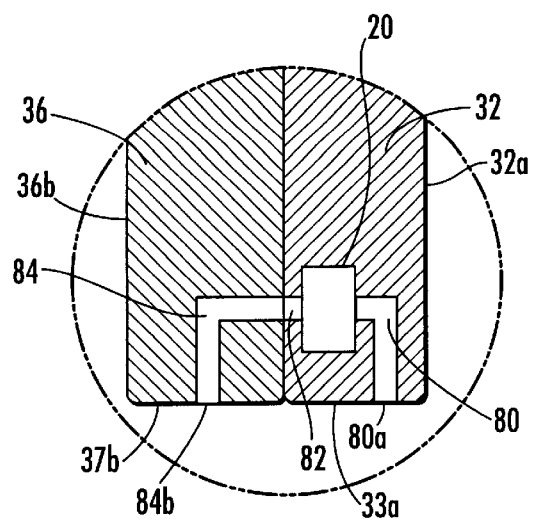

The first and third passageways 80, 84 may have various configurations. For example, the first aperture 80a may be located in an end 33a of the housing 32 as illustrated in FIG. 9B. Similarly, the fourth aperture 84b may be located in an end 37b of the battery pack 36, as illustrated in FIG. 9B.

Figure 9C:
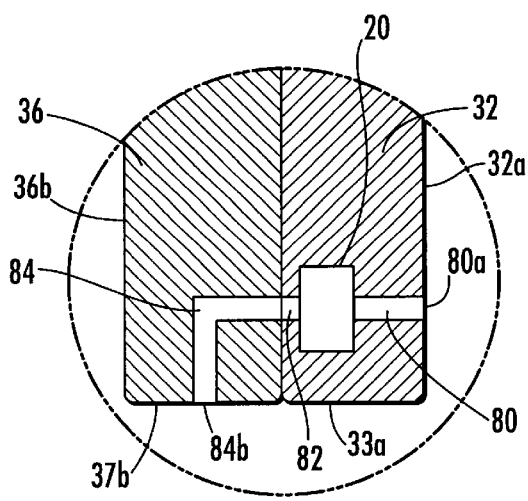
Figure 9D:
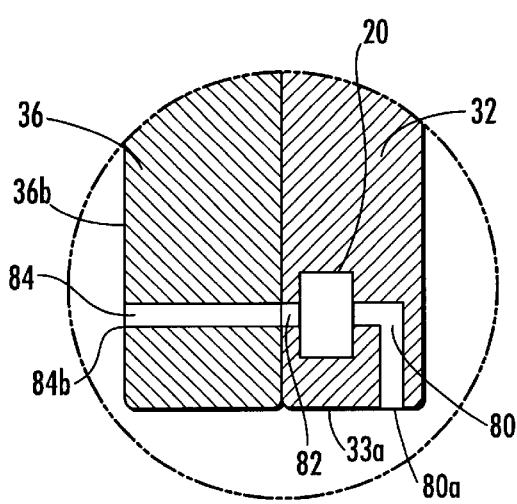

Alternatively, as illustrated in FIG. 9C, the first aperture 80a may be provided within the housing front portion 32a adjacent the housing end portion 33a and the fourth aperture 84b may be provided within an end portion 37b of the battery pack 36. Furthermore, the first aperture 80a may be provided within the housing end portion 33a and the fourth aperture 84b may be provided within the battery pack back portion 36b, as illustrated in FIG. 9D.

Figure 9E:
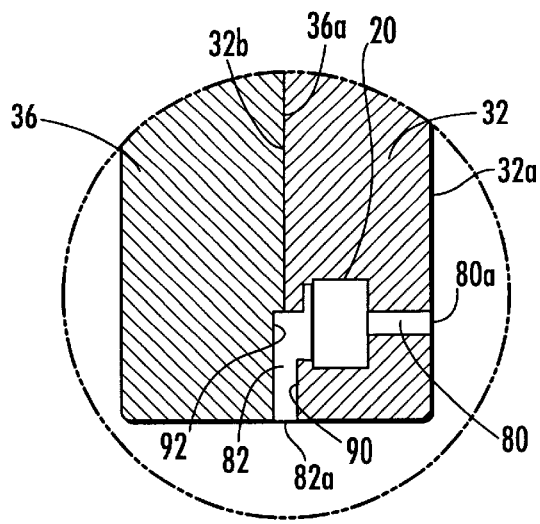
Figure 9F:
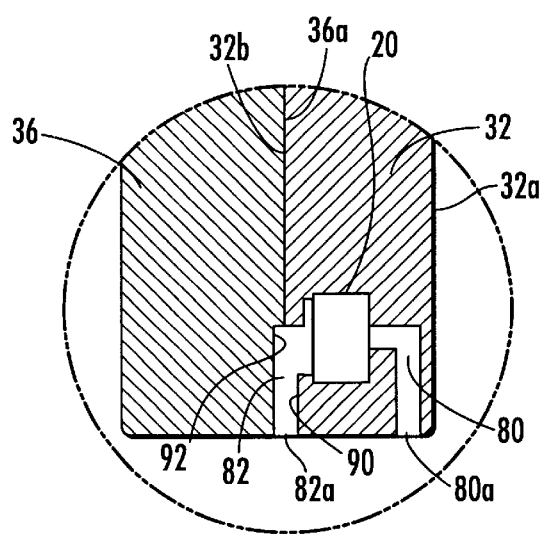

According to another embodiment of the present invention, the second passageway 82, which directs sound from ambient to the microphone 20, may be formed along the interface between the battery pack front portion 36a and the housing rear portion 32b via a first channel 90 in the housing rear portion 32b and a second channel 92 in the battery pack front portion 36a, as illustrated in FIG. 9E. The first aperture 80a may be formed within the housing front portion 32a, as illustrated in FIG. 9E, or in the housing end portion 33a as illustrated in FIG. 9E. The "multiple passageway" embodiments of FIGS. 9A–9F can be advantageous because they may facilitate the reduction of unwanted ambient noise in a transmitted voice signal.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A handheld wireless communications device, comprising:
 a housing configured to enclose a transceiver that transmits and receives wireless communications signals, wherein the housing includes a front portion and opposite proximal and distal ends, and wherein a first aperture is provided in the housing proximal end;
 a keypad comprising a plurality of keys extending through the front portion of the housing;
 a microphone disposed within the housing, wherein the microphone is in electrical communication with the transceiver and acoustic communication with the first aperture; and
 a battery pack hinged to the housing proximal end and movable between a closed position wherein the battery pack covers at least a portion of the keypad, and an open position wherein the keypad is uncovered, wherein the battery pack encloses at least one battery cell that supplies power to the communications device, and wherein the battery pack comprises:
 a front portion;
 opposite proximal and distal ends; and
 a passageway extending through the battery pack from a sound inlet in the battery pack front portion to a sound outlet in the battery pack proximal end, wherein the sound outlet is in acoustic communication with the first aperture when the battery pack is in the open position such that the sound inlet is in acoustic communication with the microphone.

2. A handheld wireless communications device according to claim 1 wherein the battery pack has a contour that generally conforms to a contour of the housing.

3. A handheld wireless communications device according to claim 1 further comprising a speaker disposed within the housing adjacent the housing distal end.

4. A handheld wireless communications device according to claim 1 wherein the sound inlet is adjacent the battery pack distal end.

5. A handheld wireless communications device according to claim 1 wherein the at least one battery cell comprises a plurality of battery cells and wherein the passageway extends through the battery pack between adjacent battery cells.

6. A handheld wireless communications device according to claim 1 wherein the battery pack covers the keypad entirely when in the closed position.

7. A handheld wireless communications device, comprising:
 a housing configured to enclose a transceiver that transmits and receives wireless communications signals, wherein the housing includes a front portion and opposite proximal and distal ends, and wherein a first aperture is provided in the housing proximal end;
 a keypad comprising a plurality of keys extending through the front portion of the housing; and
 a battery pack hinged to the housing proximal end and movable between a closed position wherein the battery pack covers at least a portion of the keypad, and an open position wherein the keypad is uncovered, wherein the battery pack encloses at least one battery cell that supplies power to the communications device, and wherein the battery pack comprises:
 a front portion;
 opposite proximal and distal ends;
 a microphone disposed within the battery pack; and
 a passageway extending into the battery pack from a sound inlet in the battery pack front portion, wherein the passageway is in acoustic communication with the microphone.

8. A handheld wireless communications device according to claim 7 wherein the battery pack has a contour that generally conforms to a contour of the housing.

9. A handheld wireless communications device according to claim 7 further comprising a speaker disposed within the housing adjacent the housing distal end.

10. A handheld wireless communications device according to claim 7 wherein the sound inlet is adjacent the battery pack distal end.

11. A handheld wireless communications device according to claim 7 wherein the battery pack covers the keypad entirely when in the closed position.

12. A handheld wireless communications device, comprising:
 a housing configured to enclose a transceiver that transmits and receives wireless communications signals;
 a microphone disposed within the housing; and
 a battery pack that is hinged to the housing and movable between a closed position wherein the battery pack covers at least a portion of the housing, and an open position wherein the housing is uncovered, wherein the battery pack encloses at least one battery cell that supplies power to the communications device, and wherein the battery pack includes an acoustic passageway therein that is coupled to the housing.

13. A handheld wireless communications device according to claim 12 wherein the acoustic passageway is configured to direct voice communications to the microphone.

14. A handheld wireless communications device according to claim 12 wherein the acoustic passageway is configured to direct ambient sound to the microphone.

15. A handheld wireless communications device according to claim 12 wherein the battery pack is removably secured to the housing at an angle relative to the housing.

16. A handheld wireless communications device according to claim 12 wherein the battery pack comprises a plurality of acoustic passageways.

17. A battery pack for providing power to a handheld wireless communications device, wherein the battery pack comprises an acoustic passageway therein and wherein the battery pack is configured to be hinged to the handheld wireless communications device and movable between a closed position wherein the battery pack covers at least a portion of the handheld wireless communications device, and an open position wherein the handheld wireless communications device is uncovered.

18. A battery pack according to claim 17 wherein the acoustic passageway is configured to direct voice communications to a microphone within the handheld wireless communications device.

19. A battery pack according to claim 17 wherein the acoustic passageway is configured to direct ambient sound to a microphone within the handheld wireless communications device.

20. A battery pack according to claim 17 wherein the battery pack is configured to be removably secured to the handheld wireless communications device at an angle relative to the handheld wireless communications device.

21. A battery pack according to claim 17 wherein the battery pack comprises a plurality of acoustic passageways.

* * * * *